R. CHASSE, DEC'D.
R. J. CHASSE, ADMINISTRATOR.
RAT TRAP.
APPLICATION FILED JULY 2, 1920.
1,429,189.  Patented Sept. 12, 1922.
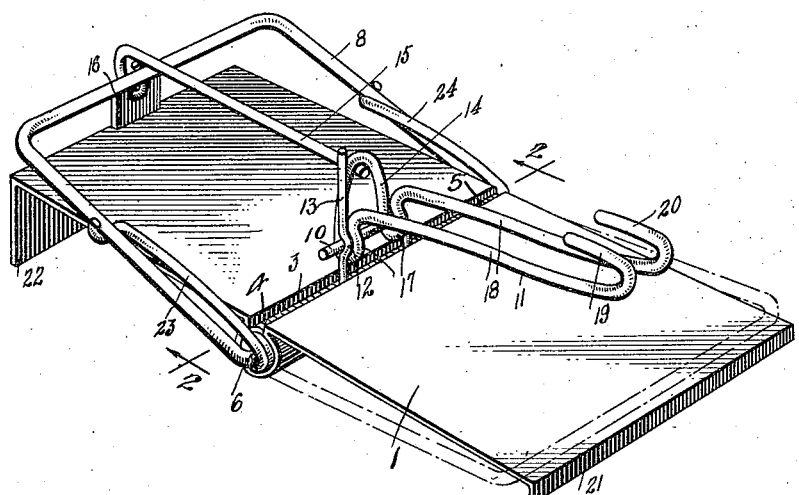
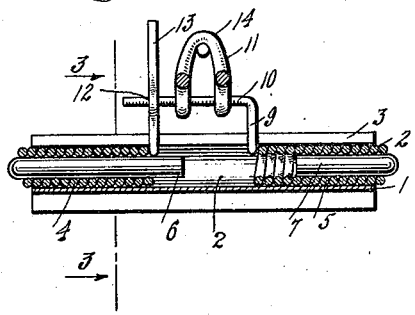
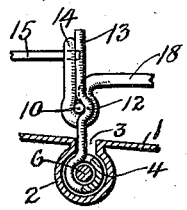
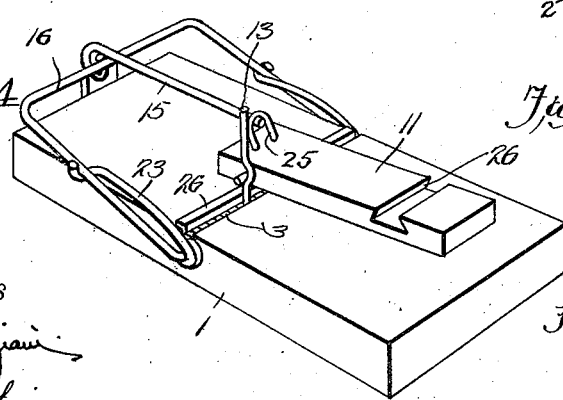
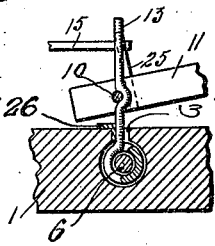
INVENTOR
Raphael Chasse,
BY
ATTORNEYS
WITNESSES Patented Sept. 12, 1922.

1,429,189

UNITED STATES PATENT OFFICE.

RAPHAEL CHASSE, OF MIDDLETOWN, NEW YORK; RUSSELL J. CHASSE ADMINISTRATOR OF SAID RAPHAEL CHASSE, DECEASED.

RAT TRAP.

Application filed July 2, 1920. Serial No. 393,512.

*To all whom it may concern:*

Be it known that I, RAPHAEL CHASSE, a citizen of the United States, and a resident of Middletown, in the county of Orange and State of New York, have invented a new and useful Rat Trap, of which the following is a full, clear, and exact description.

This invention relates to traps, and particularly to an improved trap for rats, and has for an object, the provision of a construction which is simple and comparatively cheap to produce, while at the same time presenting an extremely strong device which will properly operate each time it is tripped.

Another object of the invention is to provide a rat trap in which a comparatively large bait may be provided without danger of being accidentally removed or displaced.

A still further object of the invention is to provide a rat trap in which the trigger and associate parts are protected during shipment.

In the accompanying drawing:

Figure 1 is a perspective view of a rat trap disclosing an embodiment of the invention.

Figure 2 is a sectional view through Figure 1 on line 2—2.

Figure 3 is a fragmentary sectional view through Figure 2 on line 3—3.

Figure 4 is a detail perspective view of a trigger disclosing a slightly modified form of the invention.

Figure 5 is a sectional view similar to Figure 3, but showing a slightly modified form of the invention, in which a wood base is used.

Referring to the accompanying drawing by numerals, 1 indicates a base preferably of metal, bent so as to produce what may be termed a bore 2 extending from near one edge to the other, said bore merging into a slot 3 extending from the upper surface of the base 1 to the bore 2. In the bore 2 are arranged coil springs 4 and 5 into which the ends 6 and 7 of the bail or movable jaw 8 extend. The movable jaw 8 is of comparatively heavy material, while the springs 4 and 5 are made of much lighter material and yet give ample power, while the jaw 8 is sufficiently stiff to strike the desired blow. Spring 5 is provided with a bent up section 9 having a horizontal portion 10 acting as a pintle for the trigger 11. The portion or pintle 10 extends an appreciable distance beyond the trigger 11 so that it may fit into the curved or notched portion 12 of upstanding end 13 of spring 4. End 13 preferably extends a short distance above the loop 14 of the trigger 11, which wire forms part thereof. Loop 14 is designed to engage the free end of the retaining arm 15 when the trap is set, said retaining arm being loosely mounted on an anchoring member, as for instance bent up ear 16, and positioned over the jaw 8. The trigger 11 is formed from a wire bent into the shape shown in Figure 1, wherein loop 14 is provided which merges into ears 17 in which the portion 10 is journalled, said loops merging into parallel bars 18 which in turn merge into the hook ends 19 and 20, into which a comparatively large supply of bait may be forced so that when an animal approaches the trap and begins to eat the bait there is an ample supply to attract until trigger 11 has been moved slightly, whereupon arm 15 will be moved quickly out of the way as the springs urge the movable jaw over to a position against base 1 as shown in dotted lines in Figure 1.

It will be observed that the base 1 is made from sheet metal and that the opposite ends are bent down so that the base will be at a slight angle by reason of the fact that the flange or bent down section 21 is less than the bent down section 22. These bent down sections, however, act with the bent down central section forming bore 2 for providing end and central supports. Preferably part of the end section 22 is bent up for forming the ear 16.

Springs 4 and 5 are provided with arms 23 and 24, each arm having a hooked end portion fitting over the side sections of the movable jaw 8. In order to kill an animal as large as a rat the jaw 8 is made comparatively heavy and the springs 4 and 5 are made comparatively strong. Where the base 1 is made from metal the pressure of the members 9 and 13 will not affect the base adjacent the slot 3, but where the base is made from wood it is necessary to provide a protecting plate 26 of metal along the edges of slot 3 against which the members 9 and 13 press. This metal is preferably L-shaped in cross section and prevents the members 9 and 13 from pressing into the wood. In connection with the end 13 it will be noted that the same projects above the loop 14. This is important in that it allows a number of traps to be stacked one on the other without any chance of the loop or associate parts being moved out of their correct position. This is especially true where the base 1 is made from wood, which is done under some circumstances in order to cheapen the article. The trigger may be made from wood as shown in Figure 4, in which instance a staple 25 is used instead of the loop 14, and the projecting end 13 will prevent the staple from being pressed into the wood trigger further than desirable. Where the wood trigger is used a dove-tail slot 26 is provided which will permit a comparatively large supply of bait being inserted in such a manner as to be readily accessible to an animal but not readily removable.

Ordinarily the jaw 8 is positioned as shown by dotted lines in Figure 1. When the jaw 8 is in this position, member 11 will be resting against the base loosely while the retaining arm 15 is loosely resting on part of the base. When it is desired to use the trap, a suitable bait is placed in the hook ends 19 and 20 and the jaw 8 is swung over to the position shown in Figure 1 against the action of the springs 4 and 5. The retaining arm 15 is then placed in position as shown in Figure 4 whereby the trigger 11 will be elevated slightly from the base and held in that position until an additional weight has been placed on the trigger whereupon the rod 14 will slip off of the end of the retaining arm 15 and jaw 8 will be quickly swung over to the dotted position shown in Figure 1. In case an animal presses against the bait the jaw 8 will strike the animal and will hold the same pinched against the base 1. Usually the blow is sufficient to kill the animal.

What I claim is:

1. A rat trap comprising a base, a movable jaw pivotally mounted on said base, a retaining arm for holding said jaw in a set position, a trigger for holding said retaining arm in its set position, and a spring means acting on said movable jaw for resiliently urging the jaw in a given direction, said spring means including a coil spring having one end extending to a point above the trigger so as to protect the same against articles placed thereon, said trigger comprising a wood member having a staple on one end thereof to cooperate with the retaining arm, and a dove tailed slot at the other end in which the bait is securely held.

2. A trap of the character described comprising a base having a bore extending therethrough from one edge to the other and merging into a slot extending to one face of the base, a substantially U-shaped jaw having turned in ends extending into said bore, a pair of coil springs mounted in said bore, one end of each of said springs being formed with a hook arm interlocking with the sides of said movable jaw, the opposite end of one of said springs being bent so as to extend parallel with the upper face of the base and above said base so as to present a pintle section and the other end bent for producing a notch for receiving said pintle, said last mentioned end being formed so as to project an appreciable distance above the pintle to protect the trigger and preventing bending of the pintle, a trigger pivotally mounted on said pintle section, and a retaining arm pivotally mounted on said base and interlocking with said trigger, said arm fitting over said movable jaw when interlocking with the trigger, and an angle iron located on the edge of said slot against which the end of the spring rests, thereby insuring prevention of said spring end digging into the base.

3. A rat trap, comprising a base, a movable jaw pivotally mounted on said base, a retaining arm for holding said jaw in a set position, a trigger for holding said retaining arm in its set position, and spring means for actuating said jaw, said spring means including a pair of springs, one having one end acting as a pintle for the trigger, and the other having one end extended above and adjacent the trigger to prevent an article placed upon the trap from contacting with the trigger, and rendering the same inoperable.

RAPHAEL CHASSE.